United States Patent
Kawai et al.

(10) Patent No.: US 11,170,123 B2
(45) Date of Patent: Nov. 9, 2021

(54) REGISTRATION TERMINAL, KEY SERVER, SEARCH SYSTEM, AND COMPUTER READABLE MEDIUM

(71) Applicant: Mitsubishi Electric Corporation, Tokyo (JP)

(72) Inventors: Yutaka Kawai, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 22 days.

(21) Appl. No.: 16/628,974

(22) PCT Filed: Sep. 12, 2017

(86) PCT No.: PCT/JP2017/032857
§ 371 (c)(1),
(2) Date: Jan. 6, 2020

(87) PCT Pub. No.: WO2019/053778
PCT Pub. Date: Mar. 21, 2019

(65) Prior Publication Data
US 2020/0226279 A1 Jul. 16, 2020

(51) Int. Cl.
*G06F 21/62* (2013.01)
*H04L 9/08* (2006.01)
*H04L 29/06* (2006.01)

(52) U.S. Cl.
CPC .......... *G06F 21/6227* (2013.01); *H04L 9/083* (2013.01); *H04L 67/42* (2013.01)

(58) Field of Classification Search
CPC ............. G06F 21/6227; G06F 21/6209; G06F 21/6218; H04L 9/083; H04L 67/1097
See application file for complete search history.

(56) References Cited

U.S. PATENT DOCUMENTS 8,874,930 B2 10/2014 Chase et al.
2011/0138190 A1 6/2011 Chase et al.
(Continued)

FOREIGN PATENT DOCUMENTS

JP 2009-187140 A 8/2009
JP 2011-232475 A 11/2011
(Continued)

OTHER PUBLICATIONS

Curtmola et al., "Searchable Symmetric Encryption: Improved Definitions and Efficient Constructions", Proceedings of the 13th ACM Conference on Computer and communications Security, Oct. 2006, pp. 79-88.
(Continued)

*Primary Examiner* — Shanto Abedin
(74) *Attorney, Agent, or Firm* — Birch, Stewart, Kolasch & Birch, LLP

(57) ABSTRACT

A registration terminal registers a set of a key and a ciphertext in which an access range is set and in which the key K is encrypted in a key server, and registers a tag for searching generated from the key and a keyword for searching in a search server. A search terminal acquires a ciphertext in which an access range whose range for permitting access includes an attribute is set, and decrypts the ciphertext with a decryption key in which the attribute is set, so as to generate a key. The search terminal generates a trapdoor for searching from the key and a keyword for searching, and transmits the trapdoor to the search server to acquire data corresponding to the keyword.

4 Claims, 19 Drawing Sheets

(56) References Cited

U.S. PATENT DOCUMENTS

| | | | |
|---|---|---|---|
| 2013/0028415 A1 | 1/2013 | Takashima et al. | |
| 2013/0262863 A1* | 10/2013 | Yoshino | H04L 9/008 |
| | | | 713/165 |
| 2013/0287210 A1 | 10/2013 | Matsuda et al. | |
| 2014/0095889 A1 | 4/2014 | Araki | |
| 2014/0122900 A1* | 5/2014 | Kaushik | G06F 7/725 |
| | | | 713/189 |
| 2014/0298009 A1* | 10/2014 | Hattori | H04L 9/3073 |
| | | | 713/155 |
| 2019/0087432 A1* | 3/2019 | Sion | G06F 21/62 |

FOREIGN PATENT DOCUMENTS

| | | |
|---|---|---|
| JP | 2012-164031 A | 8/2012 |
| JP | 2013-150026 A | 8/2013 |
| JP | 5412414 B2 | 2/2014 |
| JP | 5420085 B2 | 2/2014 |
| JP | 2015-106354 A | 6/2015 |
| WO | WO 2012/095973 A1 | 7/2012 |
| WO | WO 2013/084957 A1 | 6/2013 |
| WO | WO 2014/112182 A1 | 7/2014 |

OTHER PUBLICATIONS

International Search Report issued in PCT/JP2017/032857 (PCT/ISA/210), dated Nov. 21, 2017.
Okamoto, "Cryptogram technology for realization of a bright information society. 5. Distribution management of a cipher key", bit, vol. 23, No. 12, Nov. 1, 1991, pp. 1507-1615.

* cited by examiner

REGISTRATION TERMINAL, KEY SERVER, SEARCH SYSTEM, AND COMPUTER READABLE MEDIUM

TECHNICAL FIELD

The present invention relates to a searchable encryption technique that allows searching while data remains encrypted.

BACKGROUND ART

Searchable encryption techniques are broadly divided into a public-key searchable encryption scheme and a common-key searchable encryption scheme, each of which has advantages and disadvantages.

An advantage of the public-key searchable encryption scheme is that access control can be performed. However, a disadvantage of the public-key searchable encryption scheme is that it is slower than the common-key searchable encryption scheme. On the other hand, an advantage of the common-key searchable encryption scheme is that it is faster than the public-key searchable encryption scheme. However, a disadvantage of the common-key searchable encryption scheme is that access control cannot be performed.

CITATION LIST

Patent Literature

Patent Literature 1: US 2011/138190 A
Patent Literature 2: JP 2011-232475 A

SUMMARY OF INVENTION

Technical Problem

A searchable encryption scheme that is capable of access control and is as fast as a common-key searchable encryption scheme has not been realized.

It is an object of the present invention to realize a searchable encryption scheme that is capable of access control and can make the processing speed faster.

Solution to Problem

A registration terminal according to the present invention includes:

an encryption unit to, taking as input an access range X that indicates a range for permitting access, generate a key K and a ciphertext $CT_X$ in which the access range X is set and in which the key K is encrypted;

a key registration unit to register a set of the access range X and the ciphertext $CT_X$ generated by the encryption unit in a key server;

a tag generation unit to generate a tag t for searching, taking as input the key K and a keyword w for searching; and a tag registration unit to register the tag t generated by the tag generation unit in a search server.

Advantageous Effects of Invention

In the present invention, sets each including an access range X and a ciphertext $CT_X$ are registered in a key server, and tags t are registered in a search server.

With this arrangement, a search terminal can acquire a usable key K by acquiring a decryptable ciphertext $CT_X$ on the basis of the access range X. Therefore, access control can be realized. The search terminal can execute a search process by a common-key searchable encryption scheme by generating a trapdoor, which is information to be transmitted to the search server when performing a search on the basis of the key K. Therefore, the search process can be executed at high speed as in the common-key searchable encryption scheme.

DESCRIPTION OF EMBODIMENTS

First Embodiment

*Description of Configuration*

Figure 1:
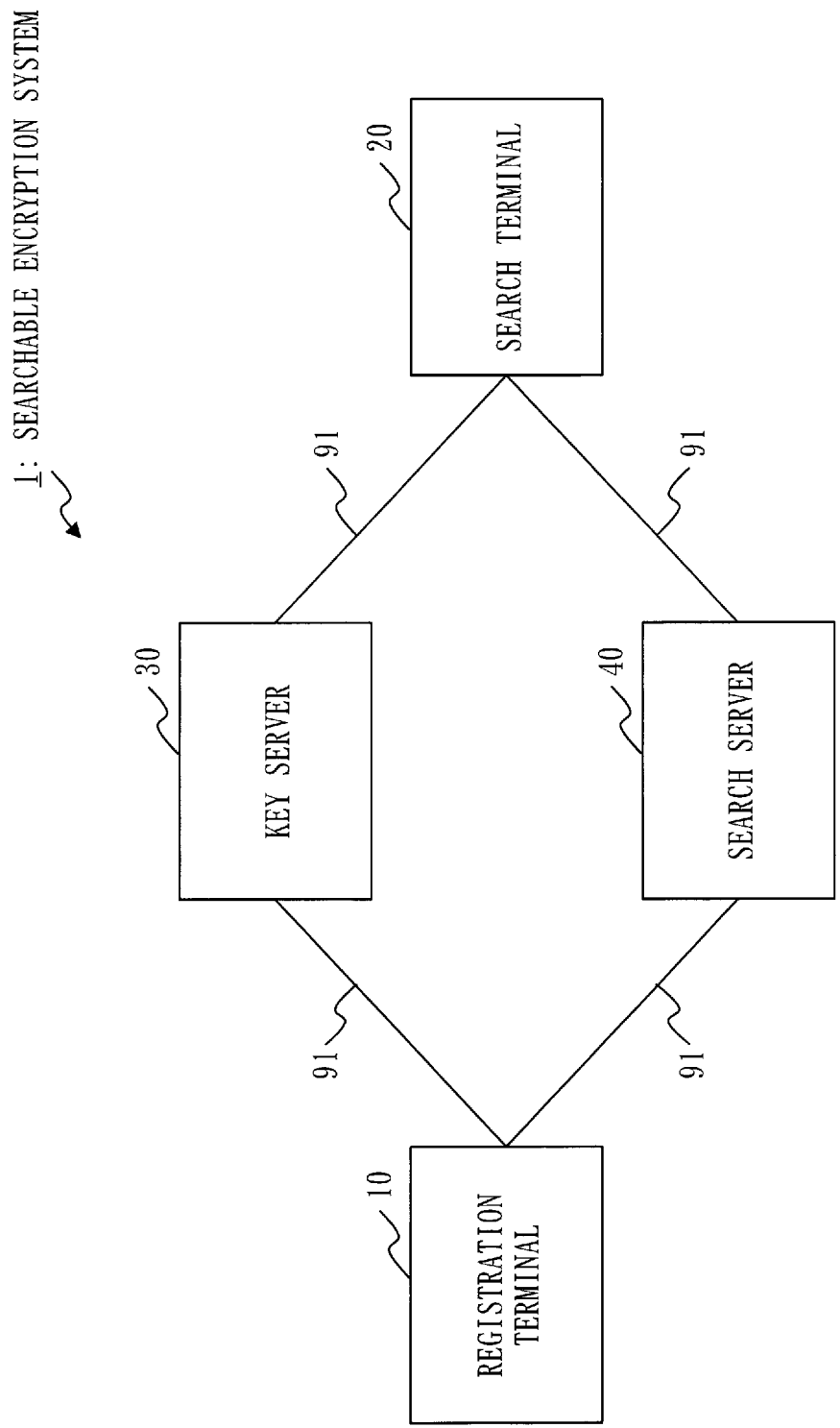
FIG. 1 is a configuration diagram of a searchable encryption system 1 according to a first embodiment.

A configuration of a searchable encryption system 1 according to a first embodiment will be described with reference to FIG. 1.

The searchable encryption system 1 includes at least one registration terminal 10, at least one search terminal 20, a key server 30, and a search server 40. The registration terminal 10 is connected with the key server 30 and the search server 40 via transmission lines 91. The search terminal 20 is connected with the key server 30 and the search server 40 via transmission lines 91.

A configuration of the registration terminal 10 according to the first embodiment will be described with reference to FIG. 2.

The registration terminal 10 includes hardware of a processor 11, a memory 12, a storage 13, and a communication interface 14. The processor 11 is connected with other hardware components via signal lines and controls these other hardware components.

The registration terminal 10 includes, as functional components, an encryption unit 111, a key registration unit 112, a tag generation unit 113, and a tag registration unit 114. The functions of the functional components of the registration terminal 10 are realized by software.

The storage 13 stores programs for realizing the functions of the functional components of the registration terminal 10. These programs are read into the memory 12 by the processor 11 and executed by the processor 11. This realizes the functions of the functional components of the registration terminal 10.

Figure 3:
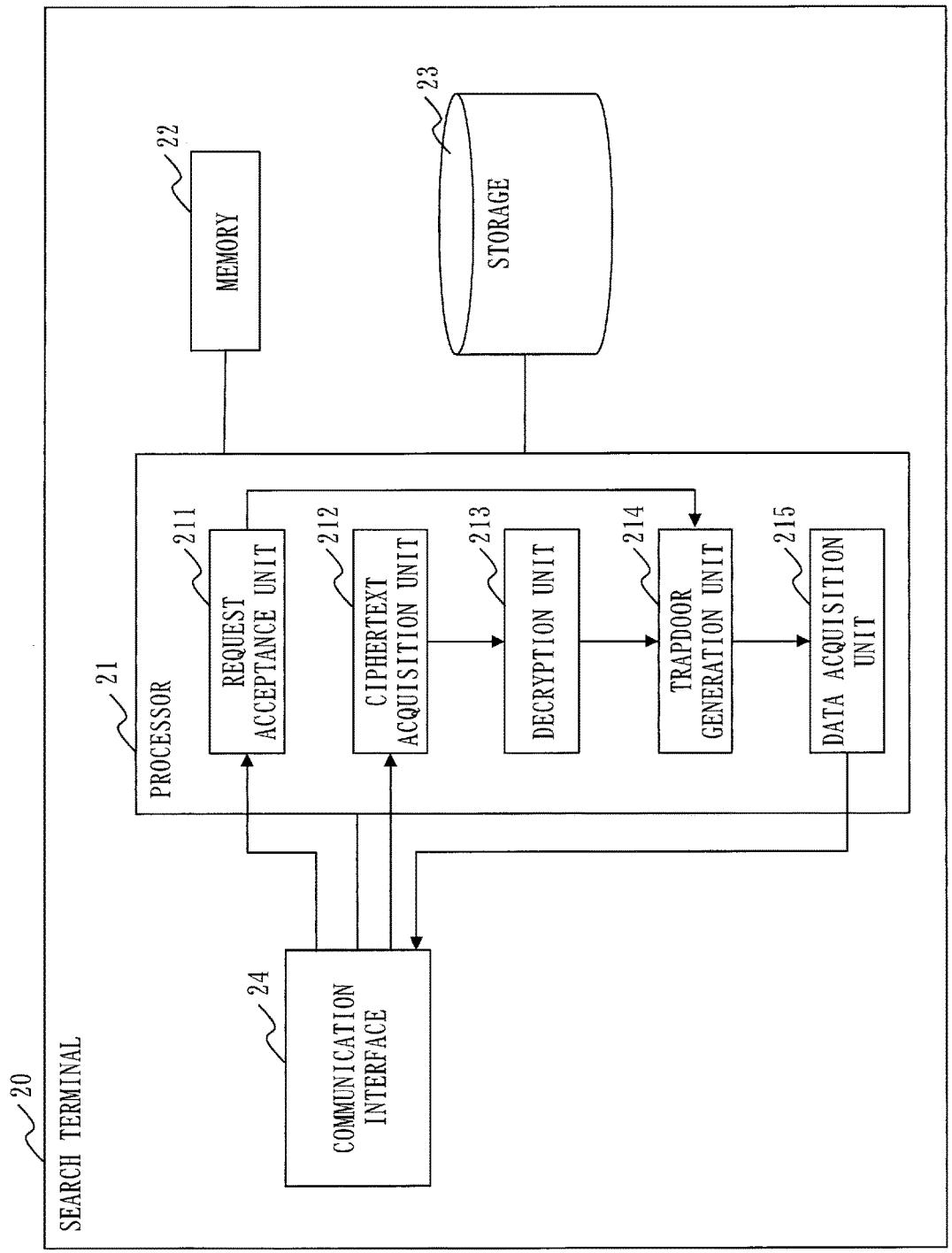
FIG. 3 is a configuration diagram of a search terminal 20 according to the first embodiment.

A configuration of the search terminal 20 according to the first embodiment will be described with reference to FIG. 3.

The search terminal 20 includes hardware of a processor 21, a memory 22, a storage 23, and a communication interface 24. The processor 21 is connected with other hardware components via signal lines and controls these other hardware components.

The search terminal 20 includes, as functional components, a request acceptance unit 211, a ciphertext acquisition unit 212, a decryption unit 213, a trapdoor generation unit 214, and a data acquisition unit 215. The functions of the functional components of the search terminal 20 are realized by software.

The storage 23 stores programs for realizing the functions of the functional components of the search terminal 20. These programs are read into the memory 22 by the processor 21 and executed by the processor 21. This realizes the functions of the functional components of the search terminal 20.

Figure 4:
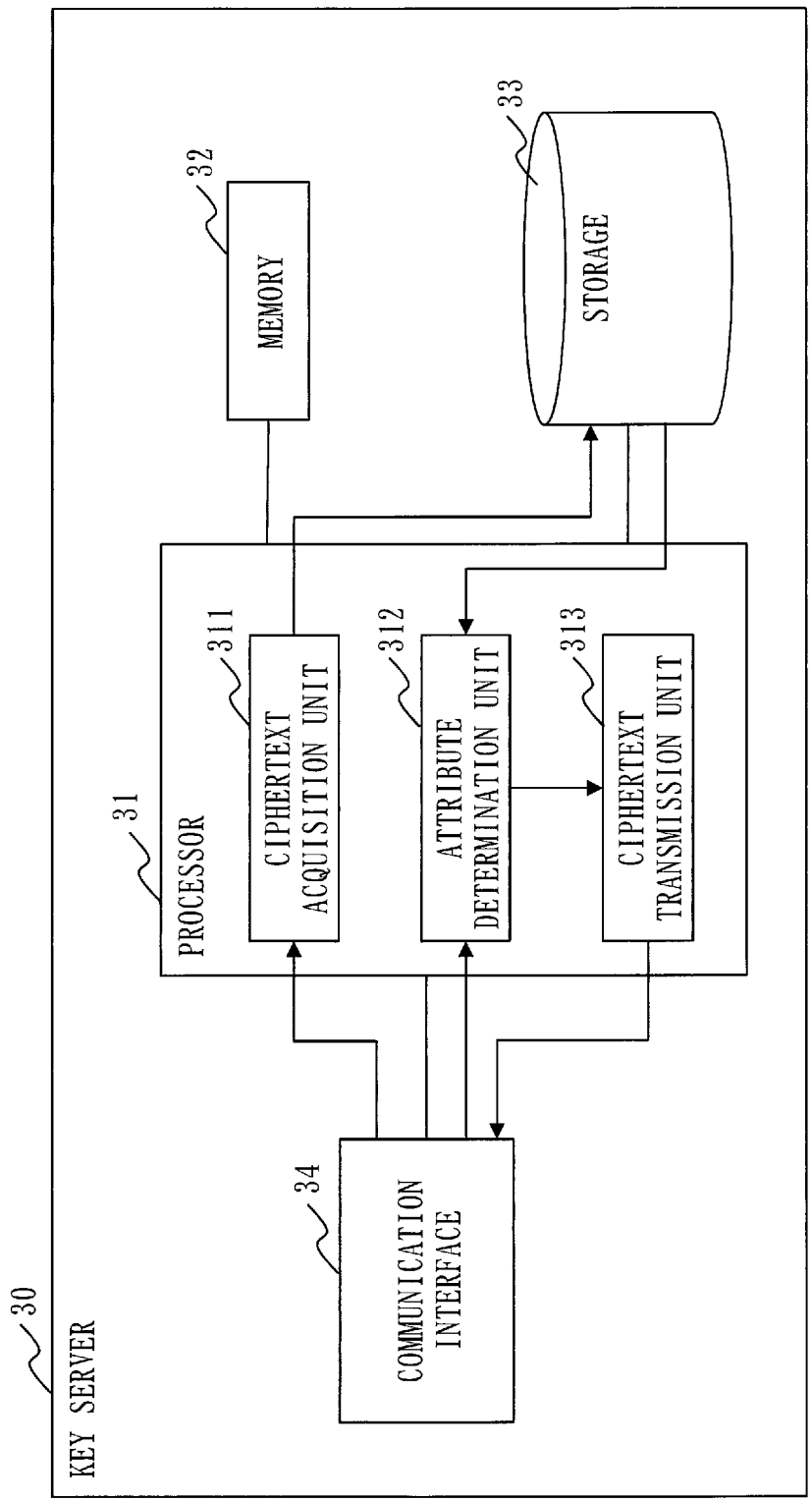
FIG. 4 is a configuration diagram of a key server 30 according to the first embodiment.

A configuration of the key server 30 according to the first embodiment will be described with reference to FIG. 4.

The key server 30 includes hardware of a processor 31, a memory 32, a storage 33, and a communication interface 34. The processor 31 is connected with other hardware components via signal lines and controls these other hardware components.

The key server 30 includes, as functional components, a ciphertext acquisition unit 311, an attribute determination unit 312, and a ciphertext transmission unit 313. The functions of the functional components of the key server 30 are realized by software.

The storage 33 stores programs for realizing the functions of the functional components of the key server 30. These programs are read into the memory 32 by the processor 31 and executed by the processor 31. This realizes the functions of the functional components of the key server 30.

A configuration of the search server 40 according to the first embodiment will be described with reference to FIG. 5.

The search server 40 includes hardware of a processor 41, a memory 42, a storage 43, and a communication interface 44. The processor 41 is connected with other hardware components via signal lines and controls these other hardware components.

The search server 40 includes, as functional components, a tag acquisition unit 411, a trapdoor acquisition unit 412, and a tag extraction unit 413. The functions of the functional components of the search server 40 are realized by software.

The storage 43 stores programs for realizing the functions of the functional components of the search server 40. These programs are read into the memory 42 by the processor 41 and executed by the processor 41. This realizes the functions of the functional components of the search server 40.

Each of the processors 11, 21, 31, and 41 is an integrated circuit (IC) that performs processing. As a specific example, each of the processors 11, 21, 31, and 41 is a central processing unit (CPU), a digital signal processor (DSP), or a graphics processing unit (GPU).

Each of the memories 12, 22, 32, and 42 is a storage device to temporarily store data. As a specific example, each of the memories 12, 22, 32, and 42 is a static random access memory (SRAM) or a dynamic random access memory (DRAM).

Each of the storages 13, 23, 33, and 43 is a storage device to store data. As a specific example, each of the storages 13, 23, 33, and 43 is a hard disk drive (HDD). Alternatively, each of the storages 13, 23, 33, and 43 may be a portable storage medium, such as a Secure Digital (SD) memory card, CompactFlash (CF), a NAND flash, a flexible disk, an optical disc, a compact disc, a Blu-ray (registered trademark) disc, or a digital versatile disk (DVD).

Each of the communication interfaces 14, 24, 34, and 44 is an interface to communicate with an external device. As a specific example, each of the communication interfaces 14, 24, 34, and 44 is a port of Ethernet (registered trademark), Universal Serial Bus (USB), or High-Definition Multimedia Interface (HDMI, registered trademark).

\*\*\*Description of Operation\*\*\*

Figure 6:
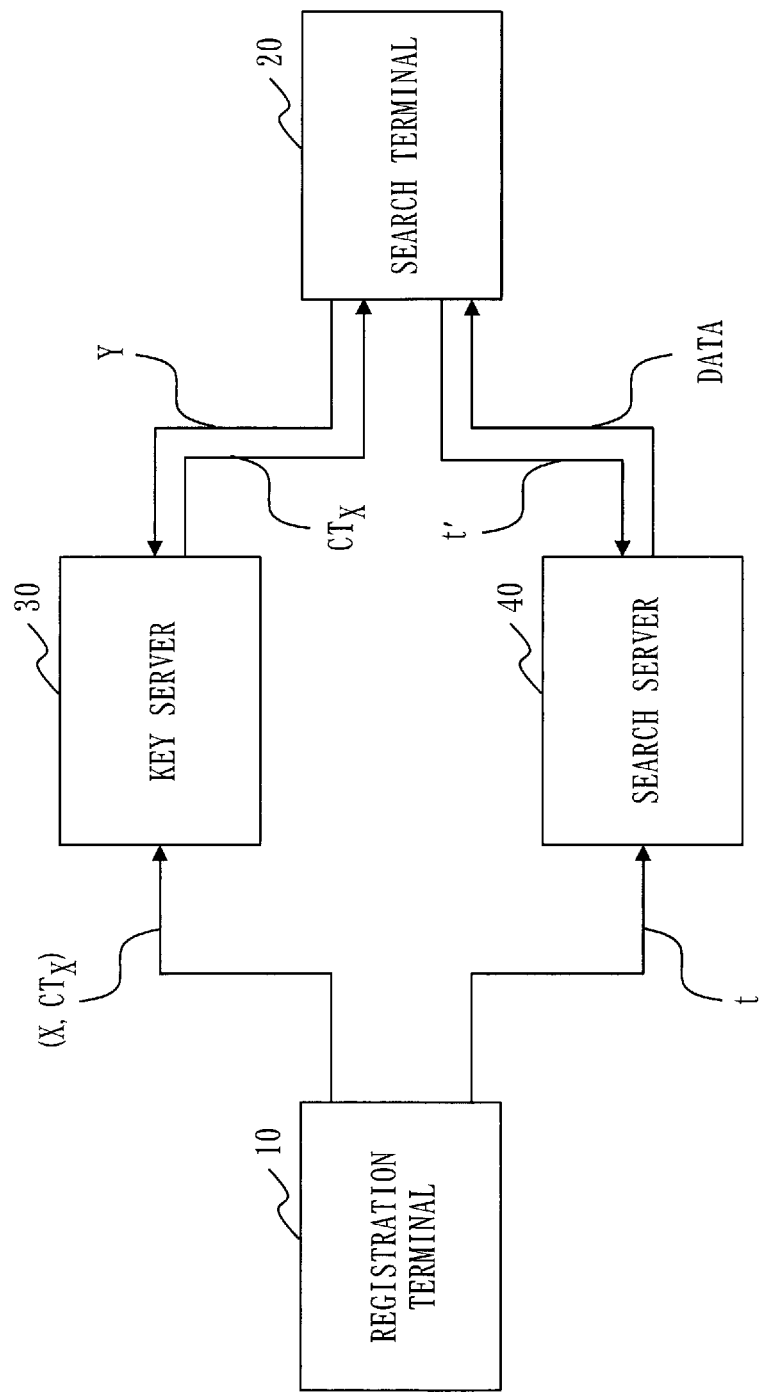
FIG. 6 is a diagram describing operation of the searchable encryption system 1 according to the first embodiment.

Operation of the searchable encryption system 1 according to the first embodiment will be described with reference to FIGS. 6 to 8.

The operation of the searchable encryption system 1 according to the first embodiment corresponds to a searchable encryption method according to the first embodiment. The operation of the searchable encryption system 1 according to the first embodiment also corresponds to processes of a searchable encryption program according to the first embodiment.

The operation of the searchable encryption system 1 according to the first embodiment includes a registration process and a search process. The registration process according to the first embodiment corresponds to a registration method according to the first embodiment. The registration process according to the first embodiment also corresponds to processes of a registration program according to the first embodiment. The search process according to the first embodiment corresponds to a search method according to the first embodiment. The search process according to the first embodiment also corresponds to processes of a search program according to the first embodiment.

The registration process according to the first embodiment will be described with reference to FIGS. 6 and 7.

(Step S11: Encryption Process)

The encryption unit 111 of the registration terminal 10 accepts input of an access range X that indicates a range for permitting access. As a specific example, the access range X is expressed by a logical expression of attributes. The access range X is input by a user of the registration terminal 10 through operation of an input device.

The encryption unit 111 generates a key K and a ciphertext $CT_X$ in which the access range X is set and in which the key K is encrypted, taking as input the accepted access range X.

Specifically, the encryption unit 111 generates the ciphertext $CT_X$ and the key K, using a Key Encapsulating Mechanism (KEM) function of a public-key encryption scheme that is capable of access control. For example, the encryption unit 111 generates the ciphertext $CT_X$ and the key K, using an Enc algorithm of a functional encryption scheme described in Non-Patent Literature 2. In this case, for example, the encryption unit 111 executes the Enc algorithm, using the access range X as an attribute set Γ and inputting a value 1 as a message m, so as to generate an element $c_0$ and an element $c_t$ as the ciphertext $CT_X$ and generate an element $c_{d+1}$ as the key K.

(Step S12: Key registration process)

The key registration unit 112 of the registration terminal 10 registers a set of the access range X accepted in step S11 and the ciphertext $CT_X$ generated in step S11 in the key server 30.

Specifically, the key registration unit 112 transmits the set of the access range X and the ciphertext $CT_X$ to the key server 30 via the transmission line 91. Then, the ciphertext acquisition unit 311 of the key server 30 acquires the transmitted set of the access range X and the ciphertext $CT_X$ and writes it to the storage 33. This causes the set of the access range X and the ciphertext $CT_X$ to be accumulated in the storage 33.

(Step S13: Tag generation process)

The tag generation unit 113 of the registration terminal 10 accepts input of a keyword w for searching. The keyword w may be any character string. The keyword w is input by the user of the registration terminal 10 through operation of an input device.

The tag generation unit 113 generates a tag t for searching, taking as input the key K generated in step S11 and the accepted keyword w for searching.

Specifically, the tag generation unit 113 generates the tag t for searching by a tag generation algorithm in a common-key searchable encryption scheme, taking as input the key K and the keyword w. For example, the tag generation unit 113 generates the tag t for searching by calculating a hash function H, taking as input the key K and the keyword w. The common-key searchable encryption scheme may be a scheme that is capable of partial match searching.

(Step S14: Tag registration process)

The tag registration unit 114 of the registration terminal 10 registers the tag t generated in step S13 in the search server 40.

Specifically, the tag registration unit 114 transmits the tag t to the search server 40 via the transmission line 91. Then, the tag acquisition unit 411 of the search server 40 acquires the transmitted tag t and writes it to the storage 43. This causes the tag t to be accumulated in the storage 43.

Note that, in step S13, the tag generation unit 113 may accept input of a message m and generate a ciphertext C by encrypting the message m with the key K by a common-key encryption scheme. Then, in step 14, the tag registration unit 114 may register a set of the tag t and the ciphertext C in the search server 40.

The search process according to the first embodiment will be described with reference to FIGS. 6 and 8.

(Step S21: Ciphertext acquisition process) The ciphertext acquisition unit 212 of the search terminal 20 transmits an attribute Y to the key server 30, and acquires a ciphertext $CT_X$ in which an access range X whose range for permitting access includes the attribute Y is set. The attribute Y is an attribute of a user of the search terminal 20.

Specifically, the ciphertext acquisition unit 212 transmits the attribute Y to the key server 30 via the transmission line 91. Then, the attribute determination unit 312 of the key server 30 extracts, from sets each including an access range X and a ciphertext $CT_X$ that are stored in the storage 33, a set whose access range X includes the attribute Y. The ciphertext transmission unit 313 of the key server 30 transmits the ciphertext $CT_X$ of the extracted set to the search terminal 20 via the transmission line 91. When a plurality of sets have been extracted, the ciphertext transmission unit 313 transmits the ciphertexts $CT_X$ of the respective sets. The ciphertext acquisition unit 212 acquires the transmitted ciphertext $CT_X$.

(Step S22: Decryption process)

The decryption unit 213 of the search terminal 20 decrypts the ciphertext $CT_X$ acquired in step S21 with a decryption key $sk_Y$ in which the attribute Y is set, so as to generate a key K.

Specifically, the decryption unit 213 decrypts the ciphertext $CT_X$ with the decryption key $sk_{Y'}$ using a decryption algorithm of the public-key encryption scheme used in step S11. When the Enc algorithm of the functional encryption scheme described in Patent Literature 2 is used in step S1*l* of FIG. 7, the decryption unit 213 decrypts the ciphertext $CT_X$ with the decryption key $sk_{Y'}$ using a Dec algorithm of the functional encryption scheme described in Patent Literature 2. In this case, for example, the decryption unit 213 uses elements $k^*_0, \ldots k^*_L$ as the decryption key $sk_Y$ and calculates a pairing operation between the elements $c_0$ and $c_t$, which are the ciphertext $CT_X$, and the elements $k^*_0, \ldots k^*_L$, so as to generate a session key K as the key K.

(Step S23: Request acceptance process) The request acceptance unit 211 of the search terminal 20 accepts input of a search request including a keyword w' for searching. The keyword w' may be any character string. The keyword w' is input by the user of the search terminal 20 through operation of an input device.

(Step S24: Trapdoor generation process) The trapdoor generation unit 214 generates a trapdoor t' for searching, taking as input the key K generated in step S22 and the keyword w' for searching accepted in step S23.

Specifically, the trapdoor generation unit 214 generates the trapdoor t' for searching by a trapdoor generation algorithm in the common-key searchable encryption scheme, taking as input the key K and the keyword w'. For example, the trapdoor generation unit 214 generates the trapdoor t' for searching by calculating the hash function H used in step S13 of FIG. 7, taking as input the key K and the keyword w'.

(Step S25: Data acquisition process)

The data acquisition unit 215 of the search terminal 20 transmits the trapdoor t' generated in step S24 to the search server 40, and acquires data corresponding to the keyword w'.

Specifically, the data acquisition unit 215 transmits the trapdoor t' to the search server 40 via the transmission line 91. Then, the trapdoor acquisition unit 412 of the search server 40 acquires the transmitted trapdoor t'. The tag extraction unit 413 of the search server 40 extracts a tag t corresponding to the trapdoor t' from the tags t stored in the storage 43, which is a storage device. For example, the tag extraction unit 413 extracts a tag t that coincides with the trapdoor t'. Then, the tag extraction unit 413 transmits data related to the extracted tag t to the search terminal 20 via the transmission line 91.

As a specific example, the data related to the tag t is an identifier of the tag t. Alternatively, the data related to the tag t may be the number of extracted tags t. Alternatively, the data related to the tag t may be a ciphertext C related to the tag t when sets each including a tag t and a ciphertext C are registered in the search server 40.

*Effects of First Embodiment* As described above, in the searchable encryption system 1 according to the first embodiment, the registration terminal 10 registers sets each including an access range X and a ciphertext $CT_X$ in the key server 30, and registers tags t in the search server 40. The search terminal 20 acquires a ciphertext $CT_X$ corresponding to an attribute Y from the key server 30 so as to generate a key K, generates a trapdoor t' with the key K, and transmits the trapdoor t' to the search server 40 so as to acquire data.

With this arrangement, the searchable encryption system 1 according to the first embodiment can realize access control and can also make the speed of the search process faster. Specifically, the key K that the search terminal 20 can acquire is limited to the key K that can be decrypted with the decryption key $sk_Y$ in which the attribute Y is set. Therefore, access control is realized. A tag t and a trapdoor t' are generated by the algorithms in the common-key searchable encryption scheme. Therefore, the speeds of the process of generating a tag t, the process of generating a trapdoor t', and the process of matching a tag t and a trapdoor t' are the same as those in the common-key searchable encryption scheme.

*Other Configurations*

<First Variation>

In the first embodiment, the search process is implemented as a single process sequence. However, the search process may be divided into two processes which are a key generation process and a data acquisition process.

Figure 9:
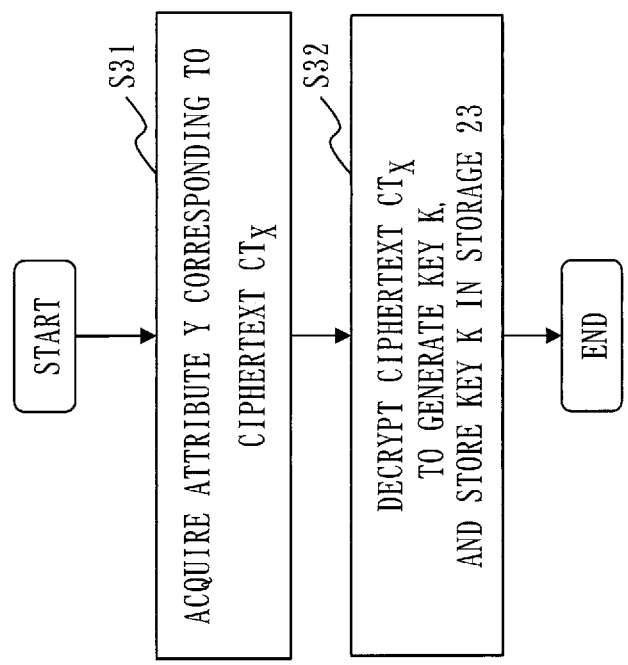
FIG. 9 is a flowchart of a key generation process according to a first variation.

The key generation process according to a first variation will be described with reference to FIG. 9.

The key generation process is executed according to any timing different from a timing of accepting a search request at the request acceptance unit 211. For example, the key generation process is executed periodically.

Figure 8:
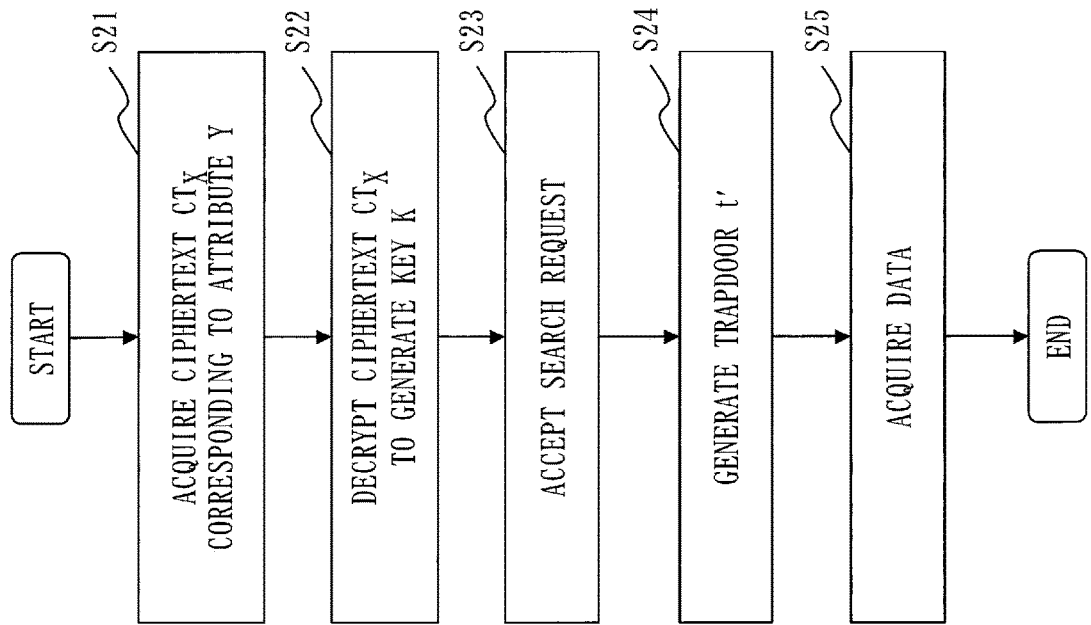
FIG. 8 is a flowchart of a search process according to the first embodiment.

Processes of step S31 to step S32 correspond to processes of step S21 to step S22 of FIG. 8. That is, in step S31, the ciphertext acquisition unit 212 acquires a ciphertext $CT_X$ according to any timing different from the timing of accepting a search request at the request acceptance unit 211. Then, in step S32, the decryption unit 213 decrypts the acquired ciphertext $CT_X$ with a decryption key $sk_Y$ so as to generate a key K, and stores the generated key K in the storage 23, which is a storage device.

Figure 10:
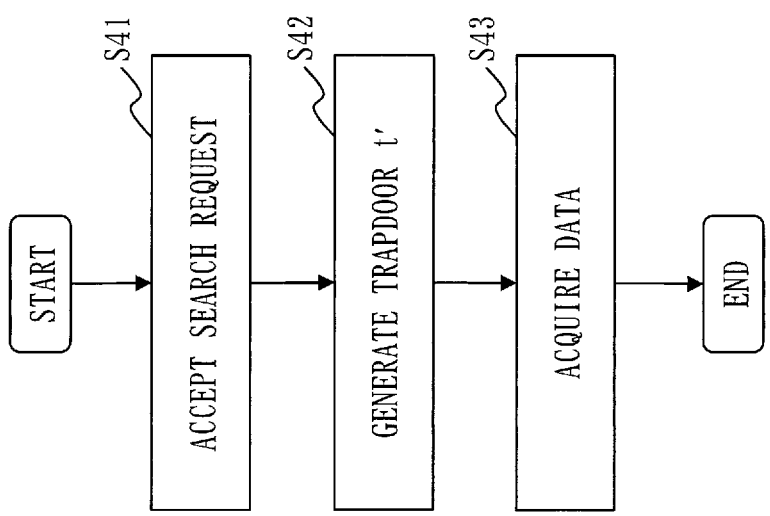
FIG. 10 is a flowchart of a data acquisition process according to the first variation.

The data acquisition process according to the first variation will be described with reference to FIG. 10.

The data acquisition process is executed according to the timing of accepting a search request at the request acceptance unit 211.

Processes of step S41 to step S43 correspond to processes of step S23 to step S25 of FIG. 8. That is, in step S41, the request acceptance unit 211 accepts a search request. Then, in step S42, the trapdoor generation unit 214 generates a trapdoor t' for searching, taking as input the key K stored in the storage 23, which is a storage device, and a keyword w' for searching. Then, in step S43, the data acquisition unit 215 transmits the trapdoor t' to the search server 40, and acquires data corresponding to the keyword w'.

The process of generating the key K in step S32 is a decryption process of the public-key encryption scheme, which takes time to process. For this reason, if the process is executed after a search request is accepted, the response time from when the search request is accepted until the data is acquired is long. Therefore, the key generation process including the time-consuming decryption process is executed before a search request is accepted. This allows the response time to be shortened.

<Second Variation>

In the first embodiment, sets each including an access range X and a ciphertext $CT_X$ are stored in the storage 33 of the key server 30. However, sets each including an access range X and a ciphertext $CT_X$ may be stored in a storage device external to the key server 30.

Similarly, in the first embodiment, tags t are stored in the storage 43 of the search server 40. However, tags t may be stored in a storage device external to the search server 40.

<Third Variation>

In the first embodiment, the functions of the functional components of the registration terminal 10, the search terminal 20, the key server 30, and the search server 40 are realized by software. As a third variation, however, the functions of the functional components of the registration terminal 10, the search terminal 20, the key server 30, and the search server 40 may be realized by hardware. With respect to this third variation, differences from the first embodiment will be described.

Figure 11:
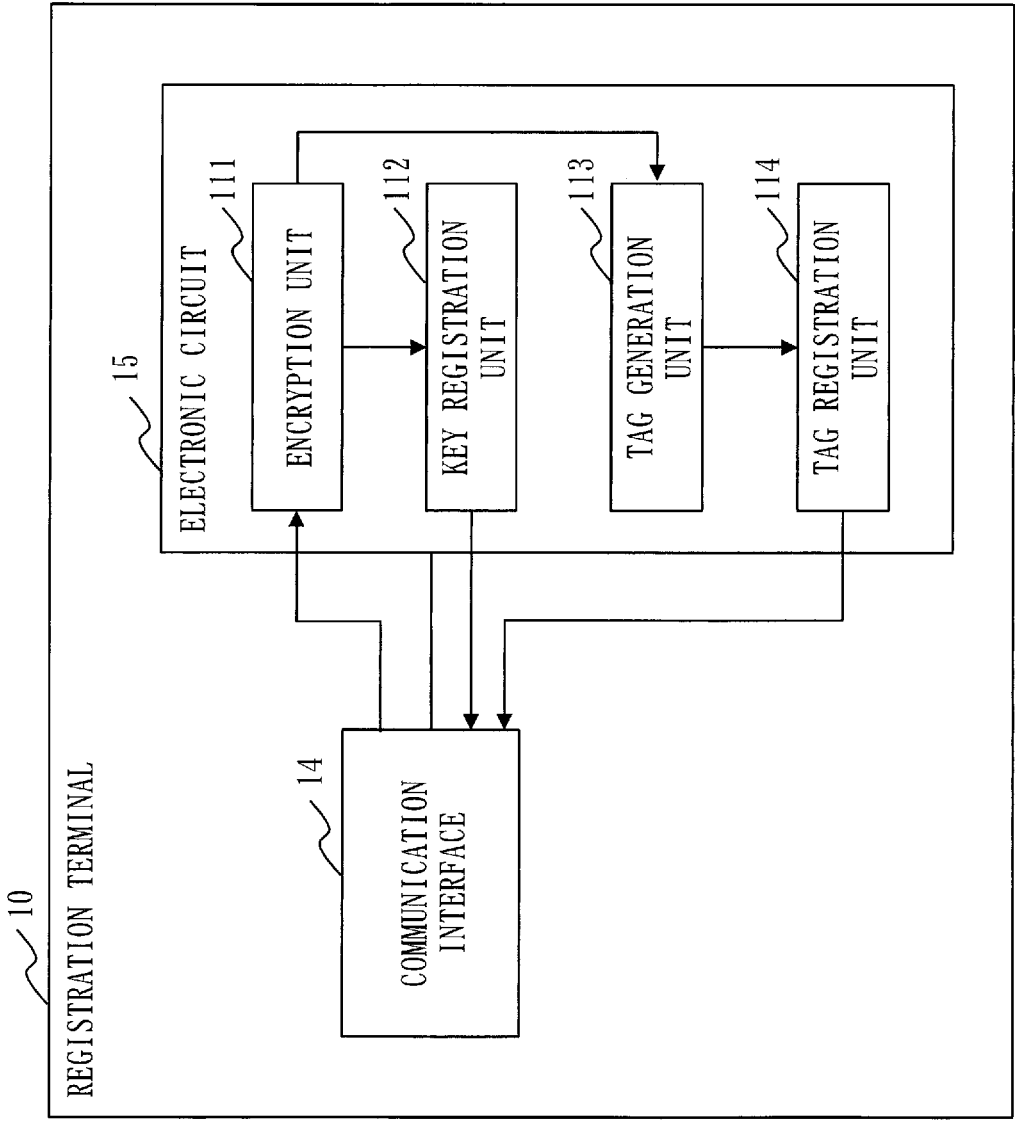
FIG. 11 is a configuration diagram of a registration terminal 10 according to a third variation.

A configuration of a registration terminal 10 according to the third variation will be described with reference to FIG. 11.

When the functions of the functional components are realized by hardware, the registration terminal 10 includes an electronic circuit 15, in place of the processor 11, the memory 12, and the storage 13. The electronic circuit 15 is a dedicated electronic circuit that realizes the functions of the units of the registration terminal 10 and the functions of the memory 12 and the storage 13.

Figure 12:
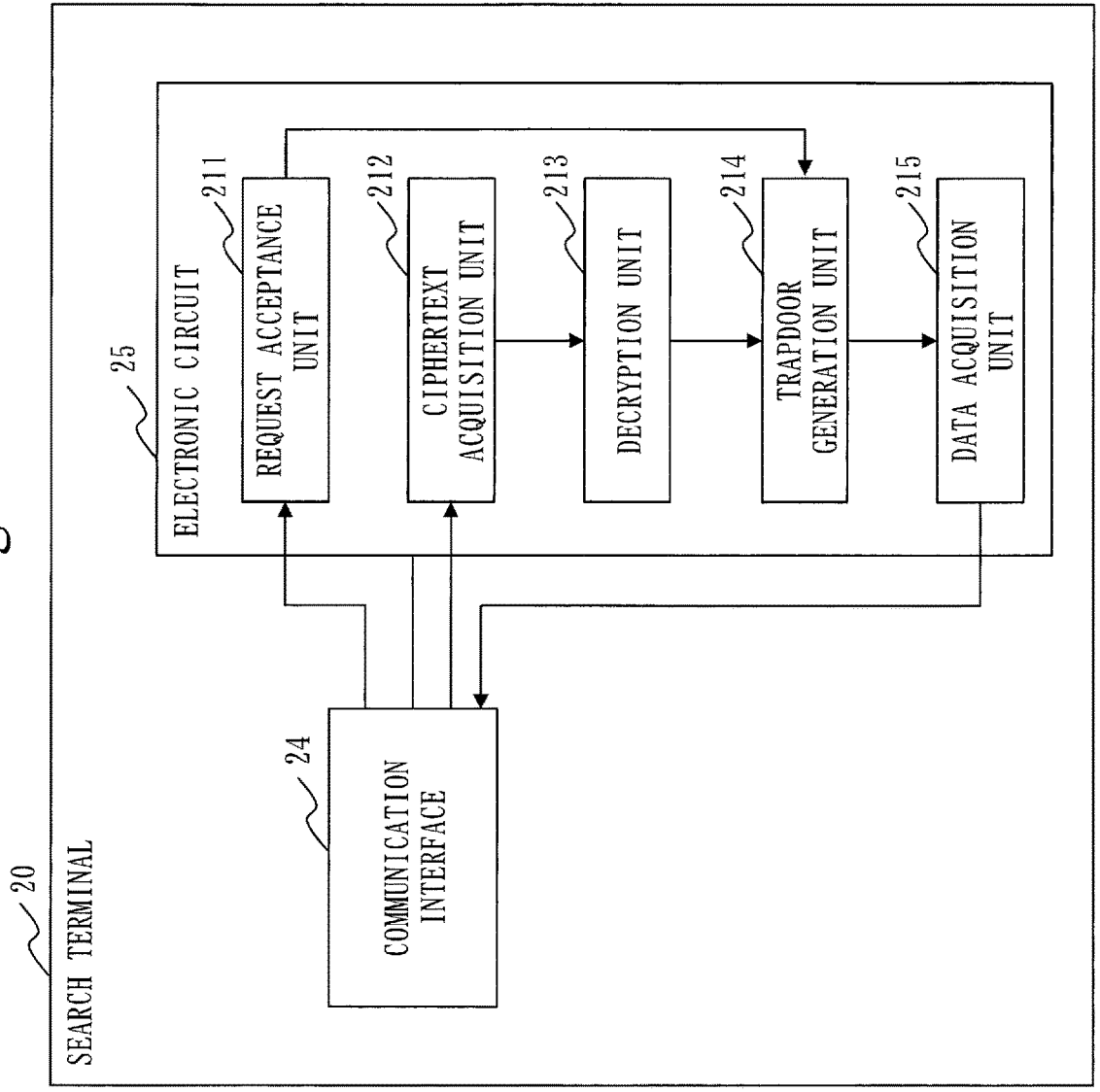
FIG. 12 is a configuration diagram of a search terminal 20 according to the third variation.

A configuration of a search terminal 20 according to the third variation will be described with reference to FIG. 12.

When the functions of the functional components are realized by hardware, the search terminal 20 includes an electronic circuit 25, in place of the processor 21, the memory 22, and the storage 23. The electronic circuit 25 is a dedicated electronic circuit that realizes the functions of the units of the search terminal 20 and the functions of the memory 22 and the storage 23.

Figure 13:
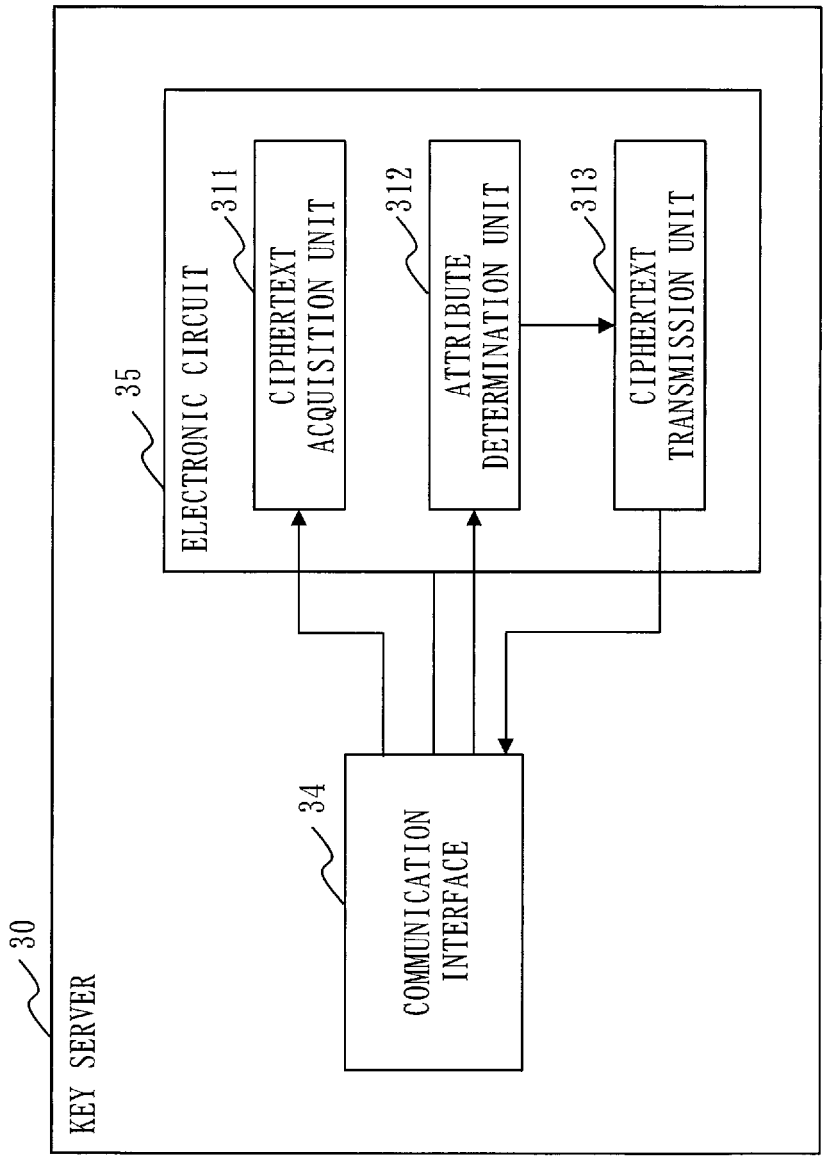
FIG. 13 is a configuration diagram of a key server 30 according to the third variation.

A configuration of a key server 30 according to the third variation will be described with reference to FIG. 13.

When the functions of the functional components are realized by hardware, the key server 30 includes an electronic circuit 35, in place of the processor 31, the memory 32, and the storage 33. The electronic circuit 35 is a dedicated electronic circuit that realizes the functions of the units of the key server 30 and the functions of the memory 32 and the storage 33.

Figure 14:
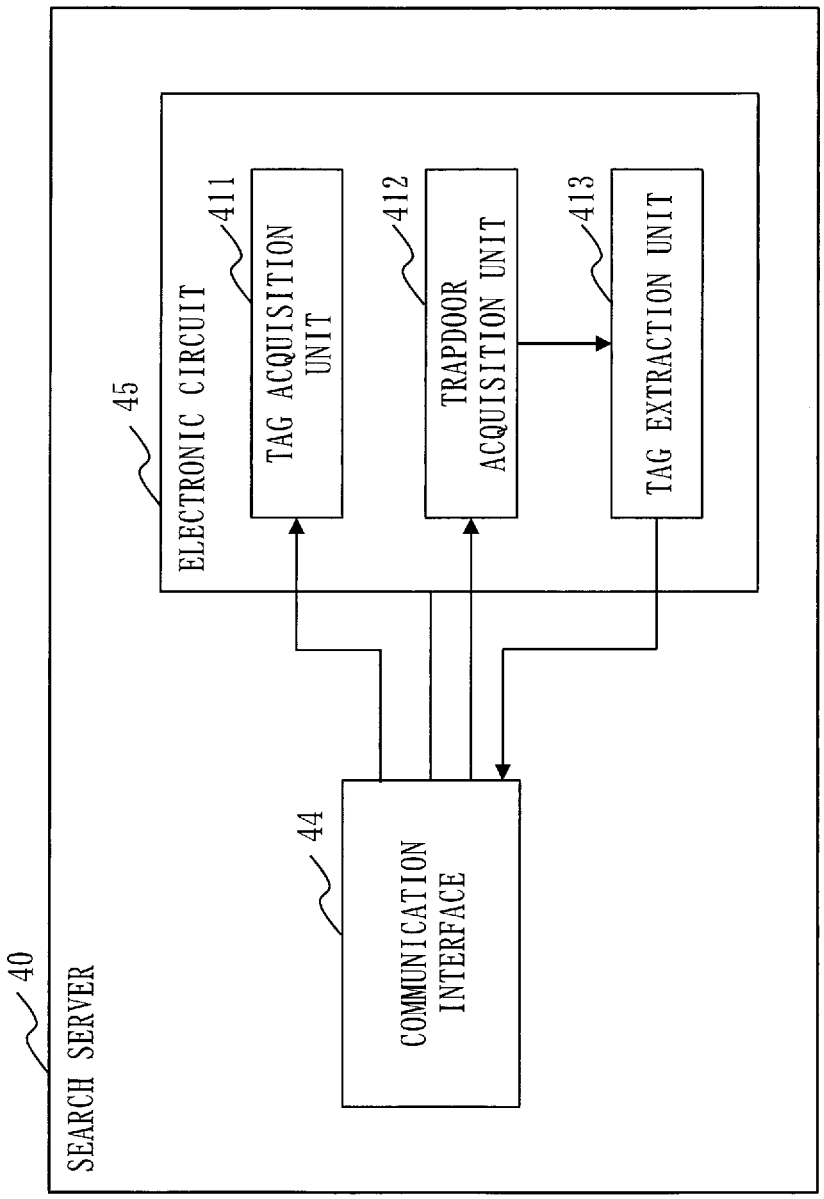
FIG. 14 is a configuration diagram of a search server 40 according to the third variation.

A configuration of a search server 40 according to the third variation will be described with reference to FIG. 14.

When the functions of the functional components are realized by hardware, the search server 40 includes an electronic circuit 45, in place of the processor 41, the memory 42, and the storage 43. The electronic circuit 45 is a dedicated electronic circuit that realizes the functions of the units of the search server 40 and the functions of the memory 42 and the storage 43.

Each of the electronic circuits 15, 25, 35, and 45 is assumed to be a single circuit, a composite circuit, a programmed processor, a parallel-programmed processor, a logic IC, a gate array (GA), an application specific integrated circuit (ASIC), or a field-programmable gate array (FPGA).

The functions of the units of the registration terminal 10 may be realized by a single electronic circuit 15. The functions of the units of the registration terminal 10 may be distributed among and realized by a plurality of electronic circuits 15. Similarly, the functions of the units of the search terminal 20 may be realized by a single electronic circuit 25.

The functions of the units of the search terminal 20 may be distributed among and realized by a plurality of electronic circuits 25. Similarly, the functions of the units of the key server 30 may be realized by a single electronic circuit 35. The functions of the units of the key server 30 may be distributed among and realized by a plurality of electronic circuits 35. Similarly, the functions of the units of the search server 40 may be realized by a single electronic circuit 45. The functions of the units of the search server 40 may be distributed among and realized by a plurality of electronic circuits 45.

<Fourth Variation>

As a fourth variation, some of the functions may be realized by hardware, and the rest of the functions may be realized by software. That is, some of the functions of the functional components of the registration terminal 10 may be realized by hardware, and the rest of the functions may be realized by software. Similarly, with respect to the search terminal 20, the key server 30, and the search server 40, some of the functions may be realized by hardware, and the rest of the functions may be realized by software.

Each of the processors 11, 21, 31, and 41, the memories 12, 22, 32, and 42, the storages 13, 23, 33, and 43, and the electronic circuits 15, 25, 35, and 45 is referred to as processing circuitry. That is, the functions of the units of the registration terminal 10, the search terminal 20, the key server 30, and the search server 40 are realized by the processing circuitry.

Second Embodiment

A second embodiment differs from the first embodiment in that tags t to be subjects of processing are narrowed down on the basis of an attribute Y before matching of a tag t and a trapdoor t'. In the second embodiment, this difference will be described and description of the same portions will be omitted.

Figure 15:
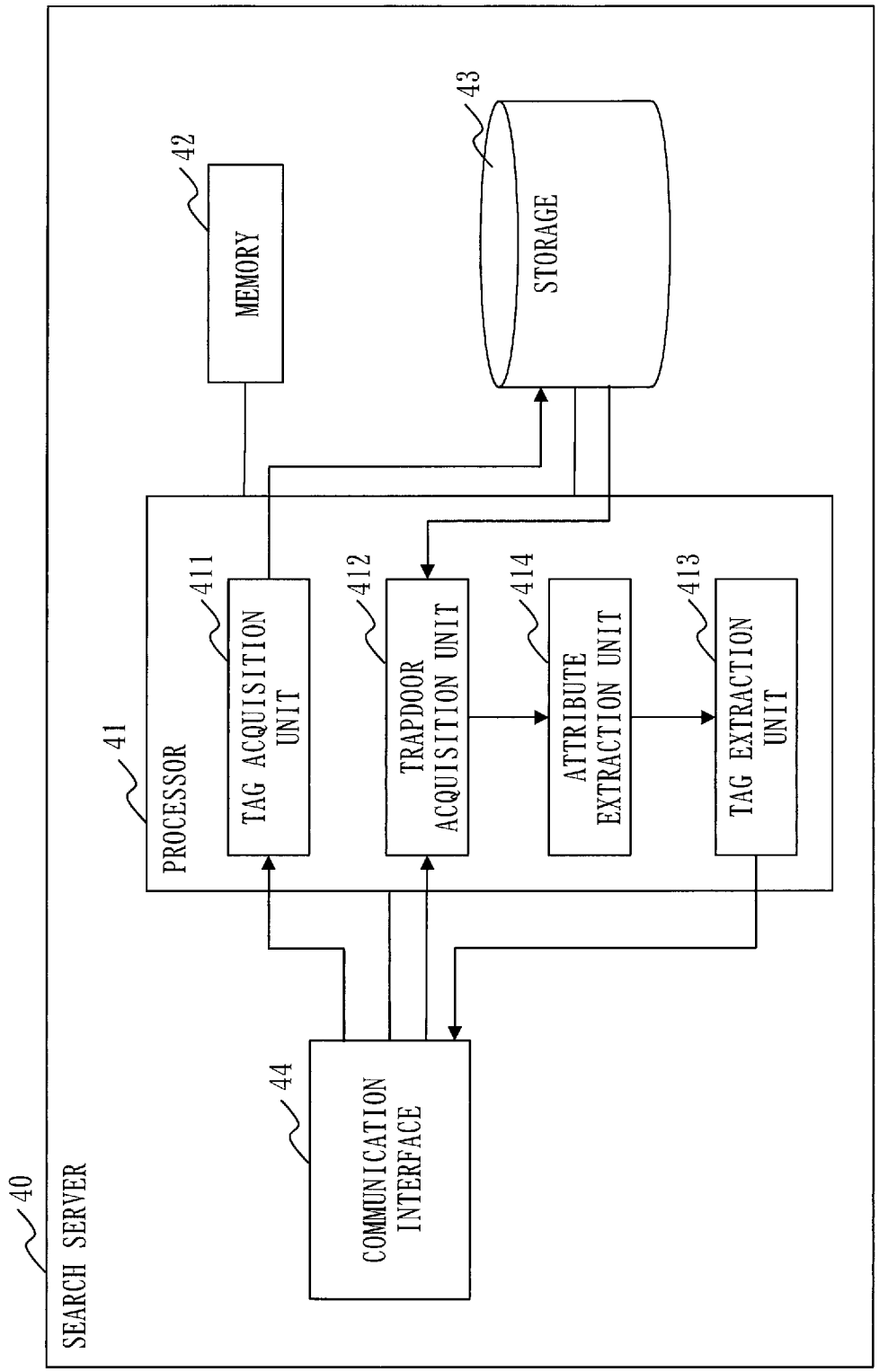
FIG. 15 is a configuration diagram of a search server 40 according to a second embodiment.

*Description of Configuration*A configuration of a search server 40 according to the second embodiment will be described with reference to FIG. 15.

Figure 5:
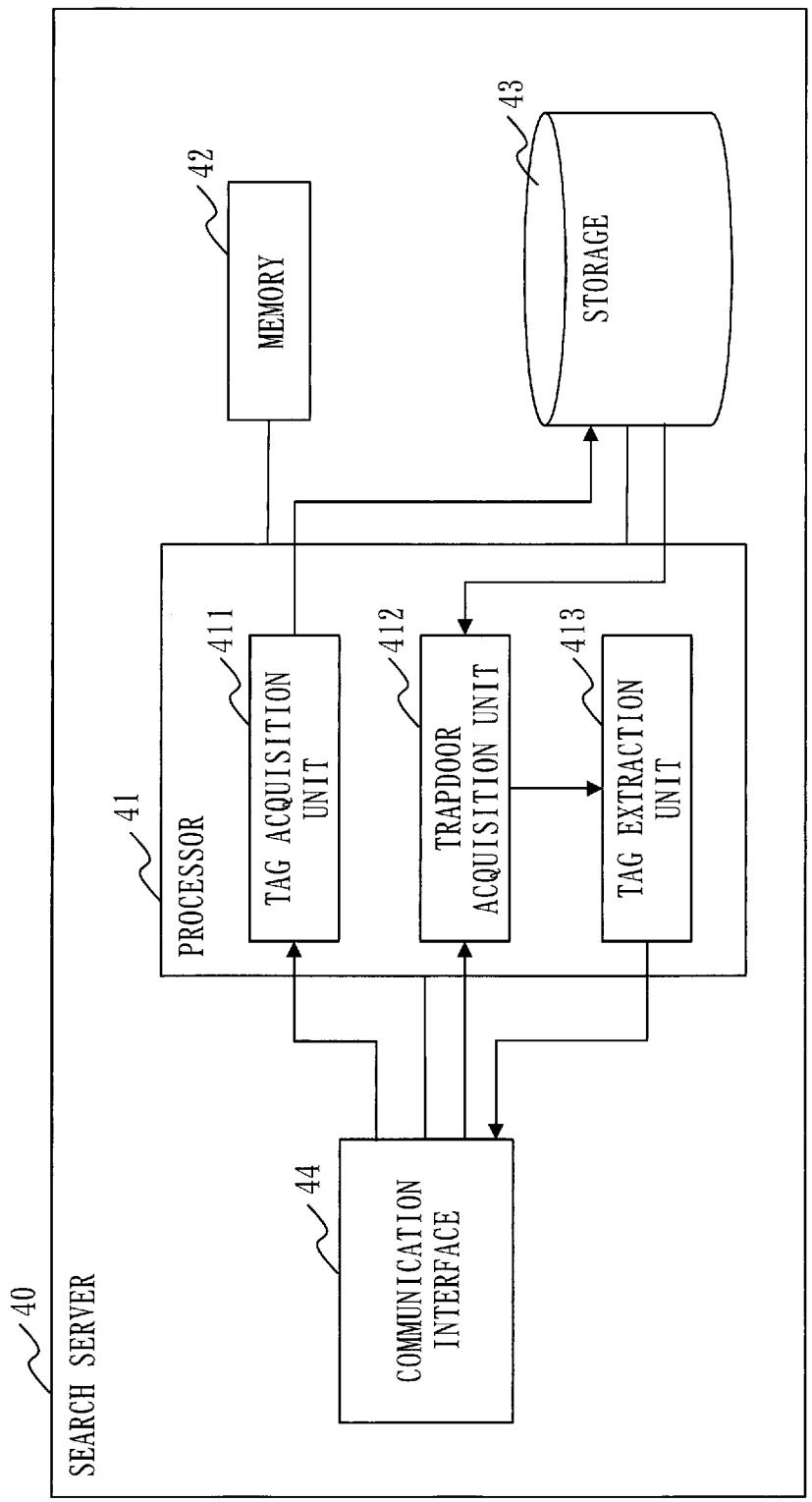
FIG. 5 is a configuration diagram of a search server 40 according to the first embodiment.

The search server 40 differs from the search server 40 illustrated in FIG. 5 in that an attribute extraction unit 414 is included as a functional component. As with the other functional components, the attribute extraction unit 414 is realized by software or hardware.

*Description of Operation*

Figure 16:
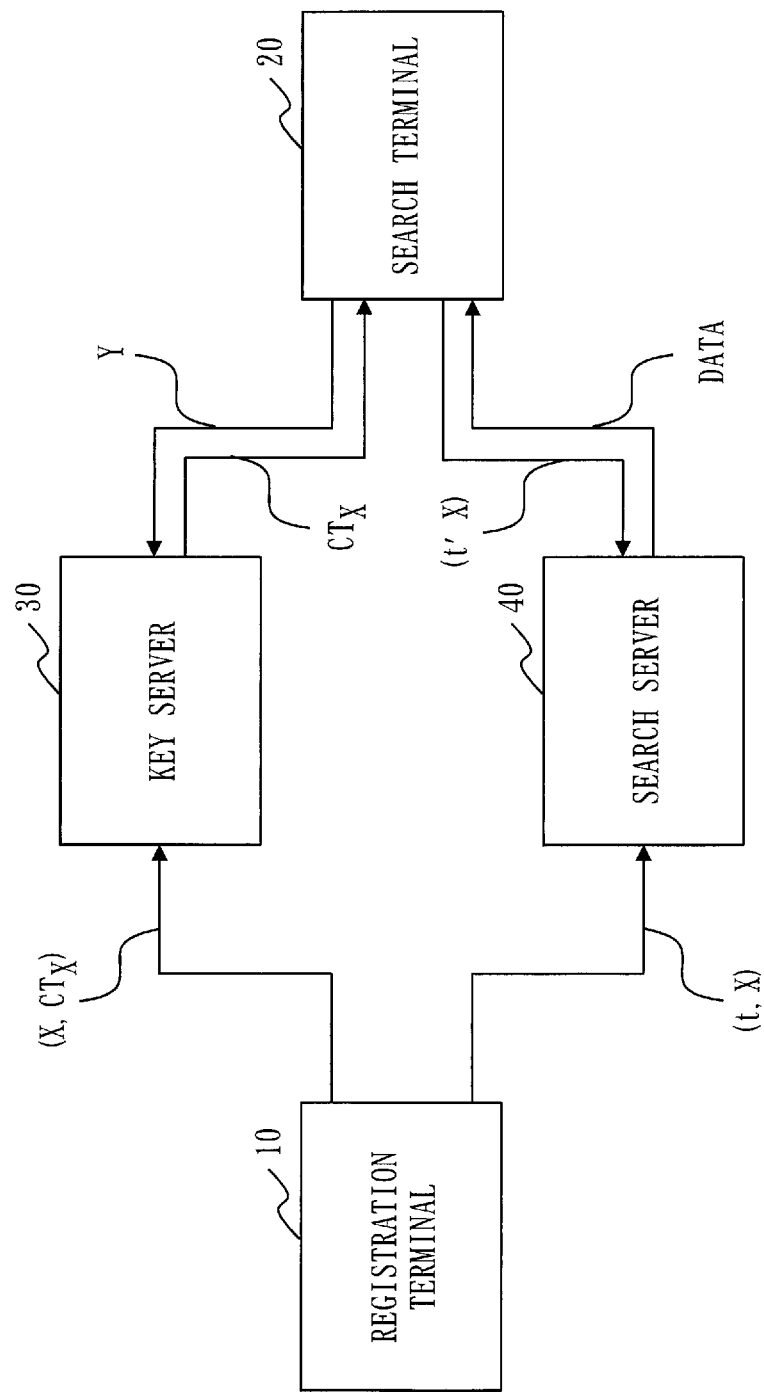
FIG. 16 is a diagram describing operation of a searchable encryption system 1 according to the second embodiment.

Operation of a searchable encryption system 1 according to the second embodiment will be described with reference to FIGS. 7, 8, and 16.

A registration process according to the second embodiment will be described with reference to FIGS. 16 and 7.

Processes of step S11 to step S13 are the same as those of the first embodiment.

(Step S14: Tag registration process)

The tag registration unit 114 of the registration terminal 10 registers a set of the access range X accepted in step S11 and the tag t generated in step S13 in the search server 40.

A search process according to the second embodiment will be described with reference to FIGS. 16 and 8.

Processes of step S21 to step S24 are the same as those of the first embodiment.

(Step S25: Data acquisition process)

The data acquisition unit 215 of the search terminal 20 transmits a set of the attribute Y and the trapdoor t' generated in step S24 to the search server 40, and acquires data related to the keyword w'.

Specifically, the data acquisition unit 215 transmits the set of the attribute Y and the trapdoor t' to the search server 40 via the transmission line 91. Then, the trapdoor acquisition unit 412 of the search server 40 acquires the transmitted set of the attribute Y and the trapdoor t'. The attribute extraction unit 414 of the search server 40 extracts, from sets each including an access range X and a tag t that are stored in the storage 43, which is a storage device, a set that includes an access range X whose range for permitting access includes the attribute Y included in the set acquired by the trapdoor acquisition unit 412. The tag extraction unit 413 extracts, from at least one set extracted by the attribute extraction unit 414, a set that includes a tag t corresponding to the trapdoor t' included in the set acquired by the trapdoor acquisition unit 412. Then, the tag extraction unit 413 transmits data related to the extracted tag t to the search terminal 20 via the transmission line 91.

*Effects of Second Embodiment*

As described above, in the searchable encryption system 1 according to the second embodiment, the registration terminal 10 registers sets each including an access range X and a tag t in the search server 40. The search terminal 20 transmits a set of an attribute Y and a trapdoor t' to the search server 40. Then, the search server 40 narrows down tags t to be subject of processing on the basis of the access range X and the attribute Y, and then extracts a tag t corresponding to the trapdoor t'.

With this arrangement, the searchable encryption system 1 according to the second embodiment can make the speed of the search process faster compared with the first embodiment. That is, in the first embodiment, tags t to which the user of the search terminal 20 does not have access rights are also subjects of the process of matching with the trapdoor t'. However, in the second embodiment, tags t are narrowed down on the basis of the attribute Y before the process of matching with the trapdoor t'. The narrowing down of tags t on the basis of the attribute Y can be performed at high speed if the tags t are arranged according to the access range X, for example. Therefore, the speed of the search process can be made faster.

Third Embodiment

A third embodiment differs from the first and second embodiments in that when the same access range X is designated, a tag t is generated using the same key K. In the third embodiment, this difference will be described, and description of the same portions will be omitted.

In the third embodiment, a case in which functions are added to the first embodiment will be described. However, the functions can also be added to the second embodiment.

*Description of Configuration*

Figure 17:
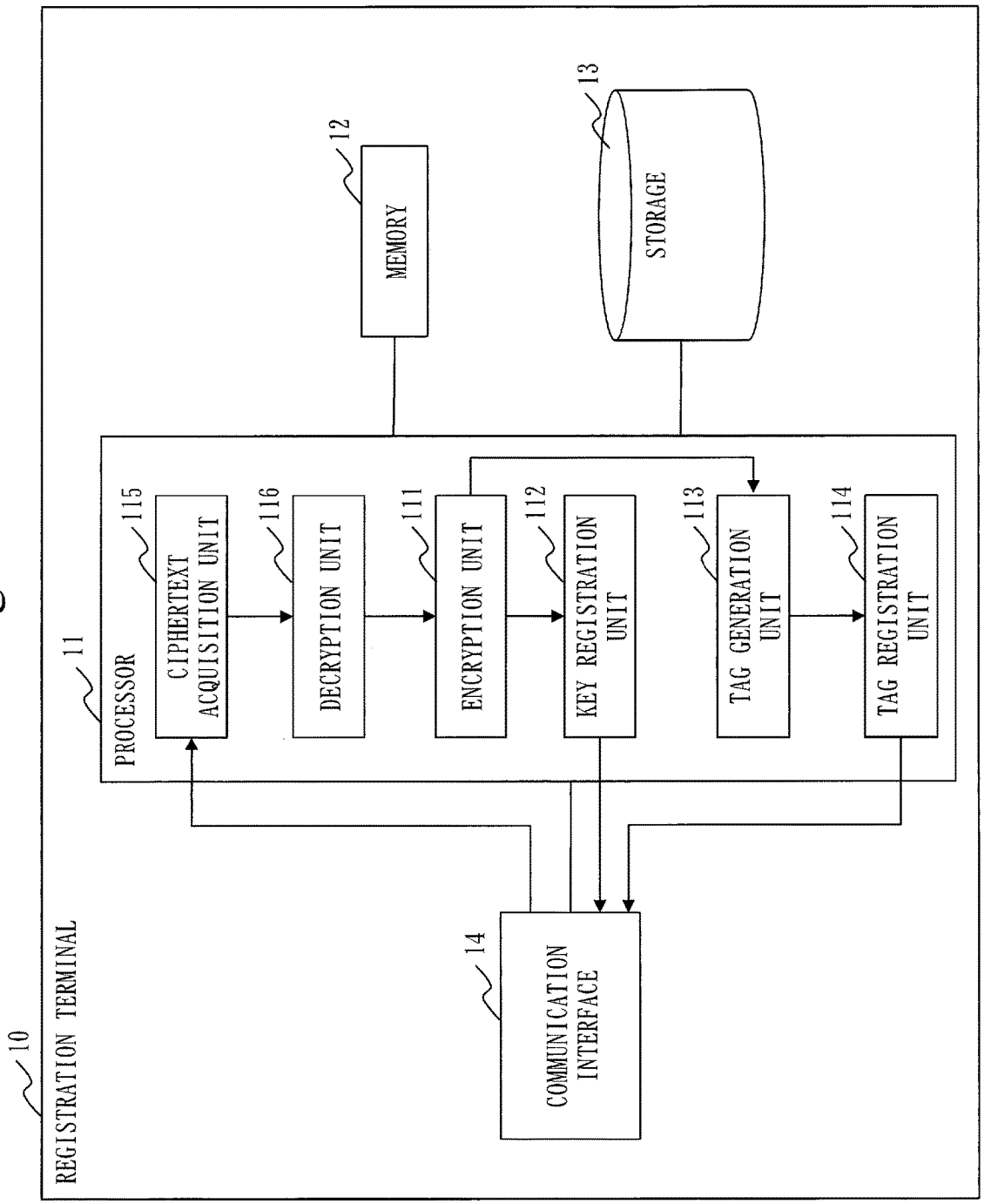
FIG. 17 is a configuration diagram of a registration terminal 10 according to a third embodiment.

A configuration of a registration terminal 10 according to the third embodiment will be described with reference to FIG. 17.

Figure 2:
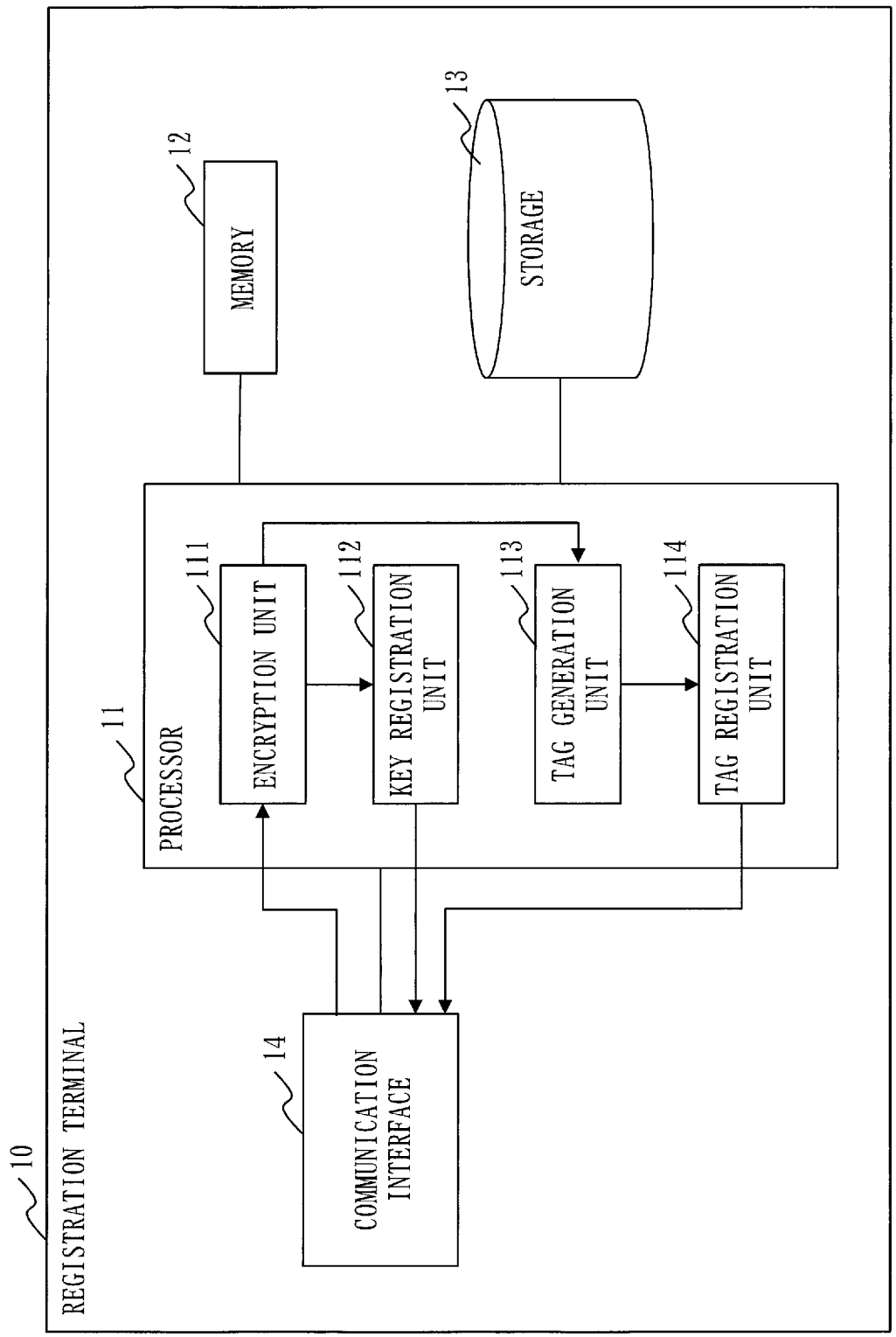
FIG. 2 is a configuration diagram of a registration terminal 10 according to the first embodiment.

The registration terminal 10 differs from the registration terminal 10 illustrated in FIG. 2 in that a ciphertext acquisition unit 115 and a decryption unit 116 are included. As with the other functional components, the ciphertext acquisition unit 115 and the decryption unit 116 are realized by software or hardware.

*Description of Operation*

Operation of a searchable encryption system 1 according to the third embodiment will be described with reference to FIGS. 18 and 19.

A registration process according to the third embodiment will be described with reference to FIGS. 18 and 19.

(Step S51: Ciphertext acquisition process) The encryption unit 111 of the registration terminal 10 accepts input of range information X. The range information X* is a range to be an access range X of a tag t generated in step S56 to be described later. As a specific example, the range information X* is expressed by a logical expression of attributes. The range information X* is input by a user of the registration terminal 10 through operation of an input device.

The ciphertext acquisition unit 115 of the registration terminal 10 transmits an attribute Y' and the range information X* indicating the range to the key server 30, and acquires a ciphertext $CT_X$ in which a registration range X' whose range for permitting registration includes the attribute Y' is set. The attribute Y' is an attribute of the user of the registration terminal 10. The registration range X' indicates a range for permitting the registration of a tag t by using the key K. As a specific example, the registration range X' is expressed by a logical expression of attributes.

Specifically, the ciphertext acquisition unit 115 transmits the attribute Y' to the key server 30 via the transmission line 91. Then, the attribute determination unit 312 of the key server 30 extracts, from sets each including an access range X, a registration range X', and a ciphertext $CT_X$ that are stored in the storage 33, a set in which an access range X indicating the same range as the range information X* is set and in which the attribute Y' is included in the registration range X'. As will be described later, the sets each including an access range X, a registration range X', and a ciphertext $CT_X$ are registered in the key server 30. The ciphertext transmission unit 313 of the key server 30 transmits the ciphertext $CT_X$ of the extracted set to the registration terminal 10 via the transmission line 91. The ciphertext acquisition unit 115 acquires the transmitted ciphertext $CT_X$.

(Step S52: Acquisition determination process)

In step S52, the ciphertext acquisition unit 115 of the registration terminal 10 determines whether or not a ciphertext $CT_X$ has been acquired.

If a ciphertext $CT_X$ has been acquired, the ciphertext acquisition unit 115 advances the process to step S53. On the other hand, if a ciphertext $CT_X$ has not been acquired, the ciphertext acquisition unit 115 advances the process to step S54.

(Step S53: Decryption process) The decryption unit 116 of the registration terminal 10 decrypts the ciphertext $CT_X$ acquired in step S51 with a decryption key $sk_{Y'}$ in which the attribute Y' is set, so as to generate a key K. The specific process is the same as in step S22 of FIG. 8, except that the decryption key $sk_{Y'}$ is used.

(Step S54: Encryption process) The encryption unit 111 of the registration terminal 10 accepts input of a registration range X' that indicates a range for permitting registration. The registration range X' is input by the user of the registration terminal 10 through operation of an input device.

The encryption unit 111 generates a key K and a ciphertext $CT_X$ in which the access range X and the registration range X' are set and in which the key K is encrypted, taking as input the access range X (=the range information X*) and the registration range X'.

Figure 7:
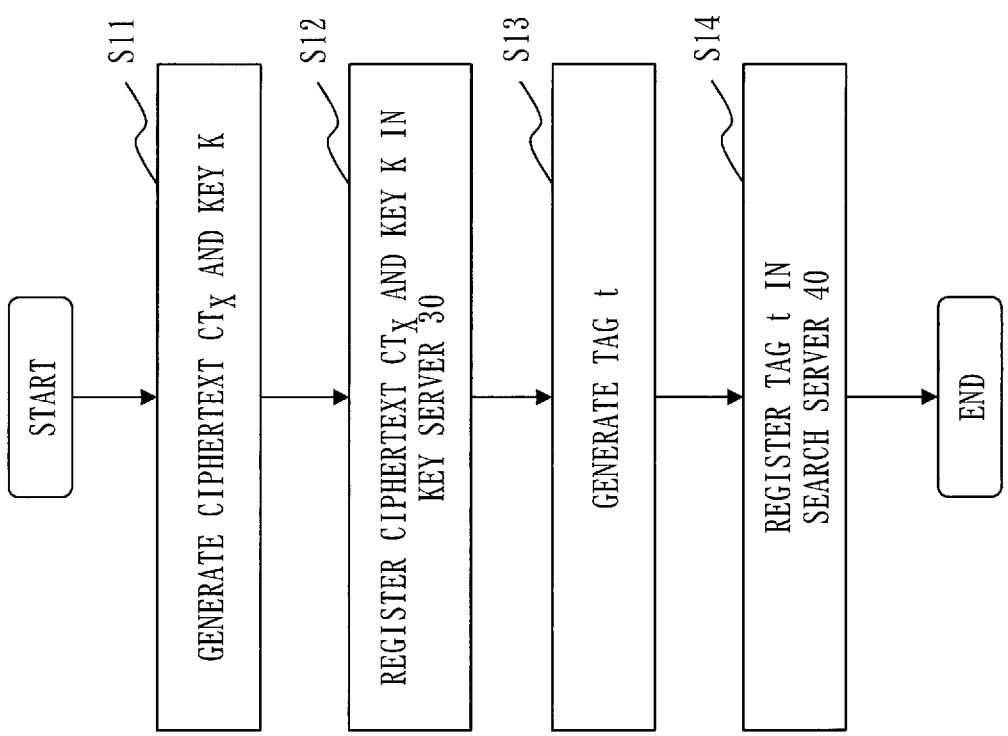
FIG. 7 is a flowchart of a registration process according to the first embodiment.

Specifically, as in step S1*l* of FIG. 7, the encryption unit 111 generates the ciphertext $CT_X$ and the key K, using the KEM function of the public-key encryption scheme that is capable of access control. At this time, the encryption unit 111 sets, as a decryption condition for the ciphertext $CT_X$, a condition that is an OR condition combining the access range X and the registration range X'. That is, the ciphertext $CT_X$ can be decrypted with a decryption key in which at least one of an attribute included in the range indicated by the access range X and an attribute included in the range indicated by the registration range X' is set.

(Step S55: Key registration process)

The key registration unit 112 of the registration terminal 10 registers a set of the access range X (=the range information X*) accepted in step S51, the registration range X' accepted in step S54, and the ciphertext $CT_X$ generated in step S54 in the key server 30.

Specifically, the key registration unit 112 transmits the set of the access range X, the registration range X', and the ciphertext $CT_X$ to the key server 30 via the transmission line 91. Then, the ciphertext acquisition unit 311 of the key server 30 acquires the transmitted set of the access range X, the registration range X', and the ciphertext $CT_X$, and writes it to the storage 33. This causes the set of the access range X, the registration range X', and the ciphertext $CT_X$ to be accumulated in the storage 33.

(Step S56: Tag generation process)

The tag generation unit 113 of the registration terminal 10 accepts input of a keyword w for searching. The keyword w may be any character string. The keyword w is input by the user of the registration terminal 10 through operation of an input device.

The tag generation unit 113 generates a tag t for searching, taking as input the key K generated in step S53 or step S54 and the accepted keyword w for searching. The specific process is the same as in step S13 of FIG. 7.

(Step S57: Tag registration process)

The tag registration unit 114 of the registration terminal 10 registers the tag t generated in step S56 in the search server 40. The specific process is the same as in step S14 of FIG. 7.

*Effects of Third Embodiment*As described above, in the searchable encryption system 1 according to the third embodiment, the registration terminal 10 generates a tag t using the same key K when the same access range X is designated.

With this arrangement, in the searchable encryption system 1 according to the third embodiment, the search terminal 20 needs only to decrypt one ciphertext $CT_X$ for one access range X. That is, in the first embodiment, the search terminal 20 may need to decrypt a plurality of ciphertexts $CT_X$ for one access range X. The decryption of a ciphertext $CT_X$ is computationally intensive and takes time to process. However, in the third embodiment, the search terminal 20 needs only to decrypt one ciphertext $CT_X$ for one access range X, so that the speed of the generation of a key K can be made faster.

Figure 18:
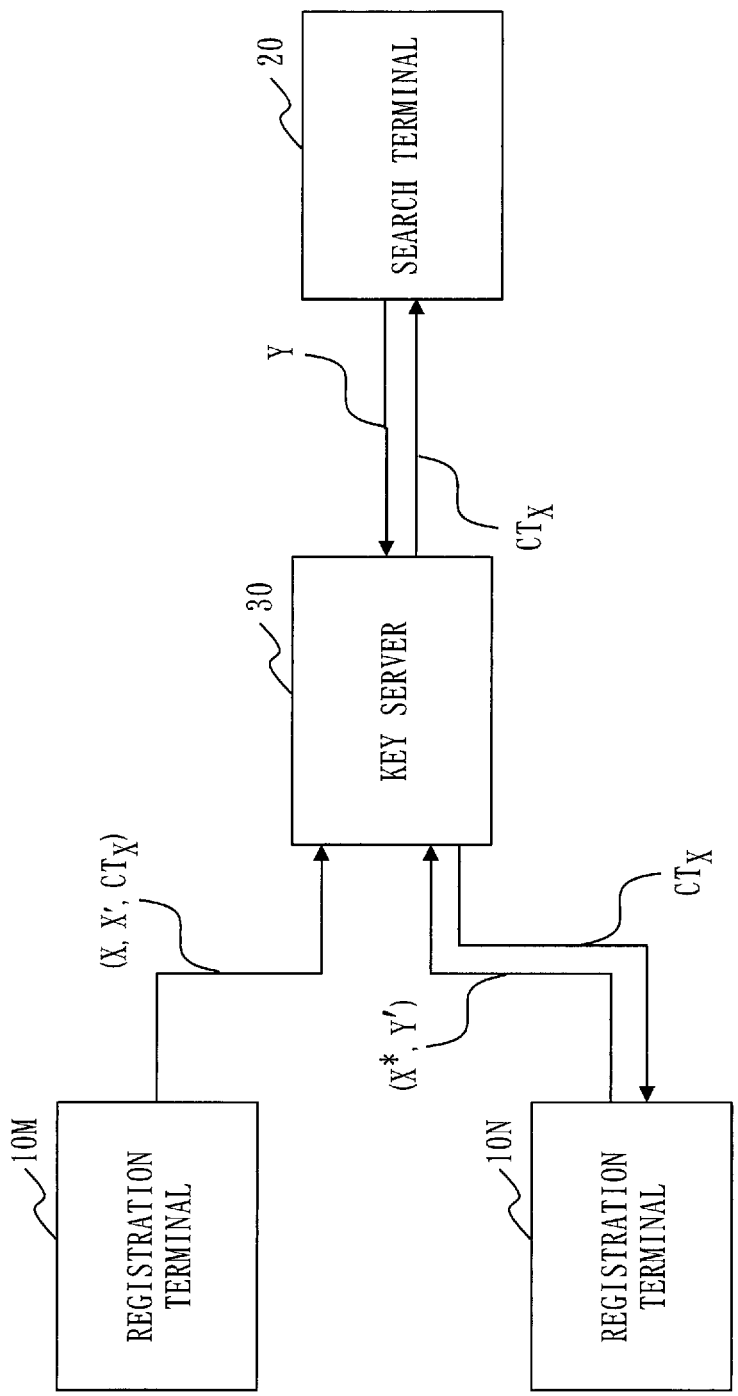
FIG. 18 is a diagram describing operation of a searchable encryption system 1 according to the third embodiment.
Figure 19:
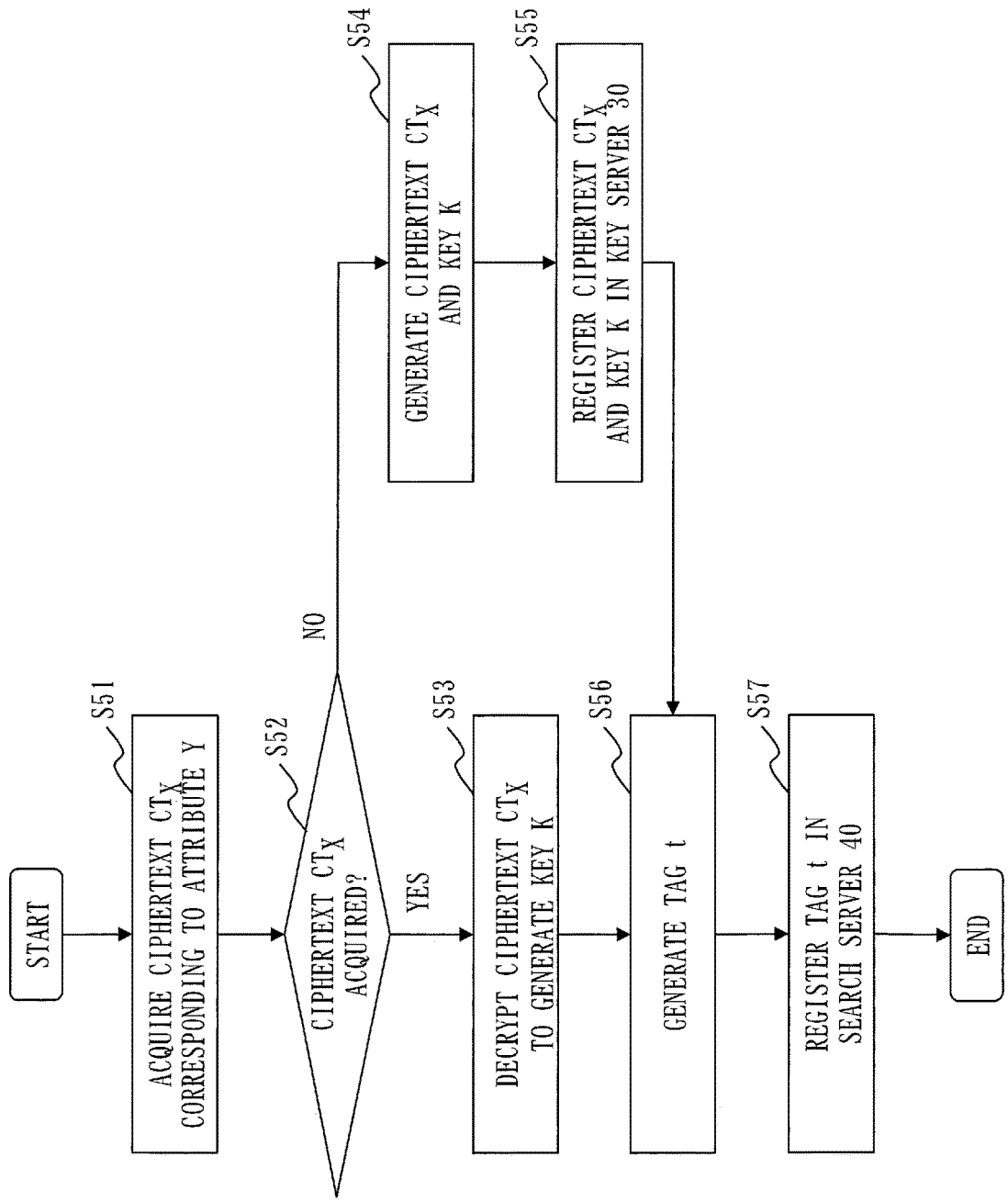
FIG. 19 is a flowchart of a registration process according to the third embodiment.

For example, in FIG. 18, assume that there is no key K corresponding to an access range X when the registration terminal 10M registers a tag t. In this case, the registration terminal 10M generates a key K and registers a ciphertext $CT_X$ in which the key K is encrypted in the key server 30, and also generates a tag t with the key K and registers the tag t in the search server 40.

Then, the registration terminal 10N designates the access range X to register a different tag t. In this case, the registration terminal 10N acquires the key K generated by the registration terminal 10M by acquiring the ciphertext $CT_X$ from the key server 30. Then, the registration terminal 1 0N generates a tag t with the key K generated by the registration terminal 10M, and registers the tag t in the search server 40.

In this way, each of the registration terminal 10M and the registration terminal 10N can generate a tag t with the same key K. As a result, the search terminal 20 needs only to decrypt one ciphertext $CT_X$ for one access range X.

REFERENCE SIGNS LIST

1: searchable encryption system, 10: registration terminal, 11: processor, 12: memory, 13: storage, 14: communication interface, 15: electronic circuit, 111: encryption unit, 112: key registration unit, 113: tag generation unit, 114: tag registration unit, 115: ciphertext acquisition unit, 116: decryption unit, 20: search terminal, 21: processor, 22: memory, 23: storage, 24: communication interface, 25: electronic circuit, 211: request acceptance unit, 212: ciphertext acquisition unit, 213: decryption unit, 214: trapdoor generation unit, 215: data acquisition unit, 30: key server, 31: processor, 32: memory, 33: storage, 34: communication interface, 35: electronic circuit, 311: ciphertext acquisition unit, 312: attribute determination unit, 313: ciphertext transmission unit, 40: search server, 41: processor, 42: memory, 43: storage, 44: communication interface, 45: electronic circuit, 411: tag acquisition unit, 412: trapdoor acquisition unit, 413: tag extraction unit, 414: attribute extraction unit, 91: transmission line

The invention claimed is:

1. A registration terminal comprising:
processing circuitry to:
generate, taking as input an access range X that indicates a range for permitting access and a registration range X' that indicates a range for permitting registration, a key K and a ciphertext $CT_X$ in which the access range X and the registration range X' are set and in which the key K is encrypted;
register a set of the access range X, the registration range X', and the generated ciphertext $CT_X$ in a key server;
transmit an attribute Y' and range information X* that indicates a range to the key server, and acquire a ciphertext $CT_X$ in which an access range X indicating a same range as the range information X* is set and in which a registration range X' whose range for permitting registration includes the attribute Y' is set;
decrypt the acquired ciphertext $CT_X$ with a decryption key sky' in which the attribute Y' is set, so as to generate a key K;
generate a tag t for searching, taking as input the generated key K and a keyword w for searching; and
register the generated tag t in a search server.

2. The registration terminal according to claim 1, wherein the processing circuitry registers a set of the access range X and the tag t in the search server.

3. A system comprising a registration terminal and a key server,
wherein the registration terminal comprises
processing circuitry to:
generate, taking as input an access range X that indicates a range for permitting access and a registration range X' that indicates a range for permitting registration, a key K and a ciphertext $CT_X$ in which the access range X and the registration range X' are set and in which the key K is encrypted;
register a set of the access range X, the registration range X', and the generated ciphertext $CT_X$ key server;
transmit an attribute Y' and range information X* that indicates a range to the key server, and acquire a ciphertext $CT_X$ in which an access range X indicating a same range as the range information X* is set and in which a registration range X' whose range for permitting registration includes the attribute Y' is set, and
wherein the key server comprises
processing circuitry to:
store, in a storage device, the registered set of the access range X that indicates a range for permitting access, the registration range X' that indicates a range for permitting registration, and the ciphertext $CT_X$ in which the access range X and the registration range X' are set and in which the key K is encrypted;
acquire, from the registration terminal, the attribute Y' and range information X*, and extract a set in which an access range X indicating a same range as the range information X* is set and in which a registration range X' whose range for permitting registration includes the attribute Y' is set; and
transmit a ciphertext $CT_X$ included in the extracted set to the registration terminal.

4. A non-transitory computer readable medium storing a registration program for causing a computer to execute:
an encryption process to, taking as input an access range X that indicates a range for permitting access and a registration range X' that indicates a range for permitting registration, generate a key K and a ciphertext $CT_X$ in which the access range X and the registration range X' are set and in which the key K is encrypted;
a key registration process to register a set of the access range X, the registration range X', and the ciphertext $CT_X$ generated by the encryption process in a key server;
a ciphertext acquisition process to transmit an attribute Y' and range information X* that indicates a range to the key server, and acquire a ciphertext $CT_X$ in which an access range X indicating a same range as the range information X* is set and in which a registration range X' whose range for permitting registration includes the attribute Y' is set;
a decryption process to decrypt the ciphertext $CT_X$ acquired by the ciphertext acquisition process with a decryption key sky' in which the attribute Y' is set, so as to generate a key K;
a tag generation process to generate a tag t for searching, taking as input the key K generated by the decryption process and a keyword w for searching; and
a tag registration process to register the tag t generated by the tag generation process in a search server.

* * * * *